United States Patent
Ding et al.

(10) Patent No.: US 11,622,021 B2
(45) Date of Patent: Apr. 4, 2023

(54) SYNCHRONOUS SHARED WEBPAGE FRAGMENT ACROSS TRUSTED DEVICES

(71) Applicant: International Business Machines Corporation, Armonk, NY (US)

(72) Inventors: Jie Ding, Ningbo (CN); Qi Ruan, Ningbo (CN); Jian Yu Wang, Ningbo (CN); Yun Ze Miao, NingBo (CN); Sheng Ju Wu, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 17/026,236

(22) Filed: Sep. 20, 2020

(65) Prior Publication Data

US 2022/0094757 A1 Mar. 24, 2022

(51) Int. Cl.
*H04L 67/10* (2022.01)
*H04L 29/08* (2006.01)
*H04L 67/02* (2022.01)
*H04L 67/55* (2022.01)
*G06F 16/958* (2019.01)
*H04L 67/1074* (2022.01)
*H04L 9/40* (2022.01)
*H04L 9/30* (2006.01)

(52) U.S. Cl.
CPC ............ *H04L 67/55* (2022.05); *G06F 16/986* (2019.01); *H04L 9/3073* (2013.01); *H04L 63/08* (2013.01); *H04L 67/108* (2013.01)

(58) Field of Classification Search
USPC .............................................. 726/23; 713/155
See application file for complete search history.

(56) References Cited

U.S. PATENT DOCUMENTS

| | | | |
|---|---|---|---|
| 8,386,619 B2 | 2/2013 | Mallet | |
| 9,154,536 B2 | 10/2015 | Nguyen | |
| 9,323,730 B2 | 4/2016 | Halevi | |
| 10,084,729 B2* | 9/2018 | Wang | H04L 51/04 |
| 10,346,523 B1 | 7/2019 | Armstrong | |
| 10,482,148 B2 | 11/2019 | Walker | |
| 10,997,269 B1* | 5/2021 | Aubert | H04L 67/02 |
| 2003/0135509 A1* | 7/2003 | Davis | H04L 67/1008 |
| 2010/0185455 A1* | 7/2010 | Miller | H04L 67/101 |
| | | | 705/1.1 |
| 2011/0179115 A1* | 7/2011 | Castro | H04L 65/4015 |
| | | | 709/204 |
| 2013/0144974 A1* | 6/2013 | Haakenson | H04L 67/55 |
| | | | 709/217 |
| 2016/0349862 A1* | 12/2016 | Harris | G06F 3/0362 |
| 2017/0032494 A1 | 2/2017 | Yuan | |
| 2017/0301446 A1* | 10/2017 | Chaizy | H01F 7/0263 |
| 2018/0198878 A1* | 7/2018 | Keldenich | H04L 67/563 |

(Continued)

FOREIGN PATENT DOCUMENTS

CN 103797508 B1 9/2018

*Primary Examiner* — Jude Jean Gilles
(74) *Attorney, Agent, or Firm* — Michael A. Petrocelli

(57) ABSTRACT

A web application is initiated with a server device. A share component of the web application is received. A connection with a receiver device is initiated. The share component is pushed to the receiver device. An updated share component is received from the receiver device. The updated share component is a modified version of the share component. The updated share component is pushed to the server device.

20 Claims, 8 Drawing Sheets

(56) References Cited

U.S. PATENT DOCUMENTS

| | | | |
|---|---|---|---|
| 2018/0324802 A1* | 11/2018 | Watts | H04W 12/088 |
| 2019/0239967 A1* | 8/2019 | Ragosta | A61B 34/35 |
| 2019/0294461 A1* | 9/2019 | Woods | G06F 16/14 |
| 2019/0364108 A1* | 11/2019 | Berger | H04L 69/14 |

* cited by examiner

SYNCHRONOUS SHARED WEBPAGE FRAGMENT ACROSS TRUSTED DEVICES

BACKGROUND

The present invention relates generally to webpages, and more particularly to fragmented webpage tasks across multiple devices.

Hypertext Markup Language (HTML) is a markup language used for structuring and presenting content on the world wide web. It can be assisted by technologies such as cascading system sheets (CSS) and scripting languages such as JavaScript. Web browsers receive HTML documents from a web server or from local storage and render the documents into multimedia pages. HTML describes the structure of a web page semantically. HTLM elements are the building blocks of HTML pages. With HTML constructs, images and other objects such as interactive forms may be embedded into the rendered page. HTML provides a means to create structured documents by denoting structural semantics for text such as headings, paragraphs, lists, links, quotes and other items.

SUMMARY

Embodiments of the present invention include a computer-implemented method, computer program product, and computer system for synchronous shared webpage fragments across devices. In one embodiment, a web application is initiated with a server device. A share component of the web application is received. A connection with a receiver device is initiated. The share component is pushed to the receiver device. An updated share component is received from the receiver device. The updated share component is a modified version of the share component. The updated share component is pushed to the server device.

DETAILED DESCRIPTION

Users tend to fragment daily tasks, meaning the users tend to process a task across multiple devise. When a user wants to continue the interrupted task on another device, currently the user must request data from the same remote central server/cloud that they requested from on the first device. This has a few disadvantages: need for re-authorization across devices, extra steps are needed for saving task context, work scenario with non-saving content cannot be restored across device, and user is working with the whole application, instead of the fragments related to the task, which can consume larger amounts of resources.

Embodiments of the present invention provide a solution by synchronously sharing webpage fragments across trusted devices. The piece of work the user is working on is fragmented and a piece of that work (maybe a form) is shared to another device. The user can continue to work on the second device without, for example, inputting the URL in a browser, logging in, going to the webpage the user was working on, and finding the fragment to keep working. When the user has completed their work on the second device and/or wants to go back to working on the first device, the user can continue to work on the first device without losing any of the information entered on the second device.

Figure 1:
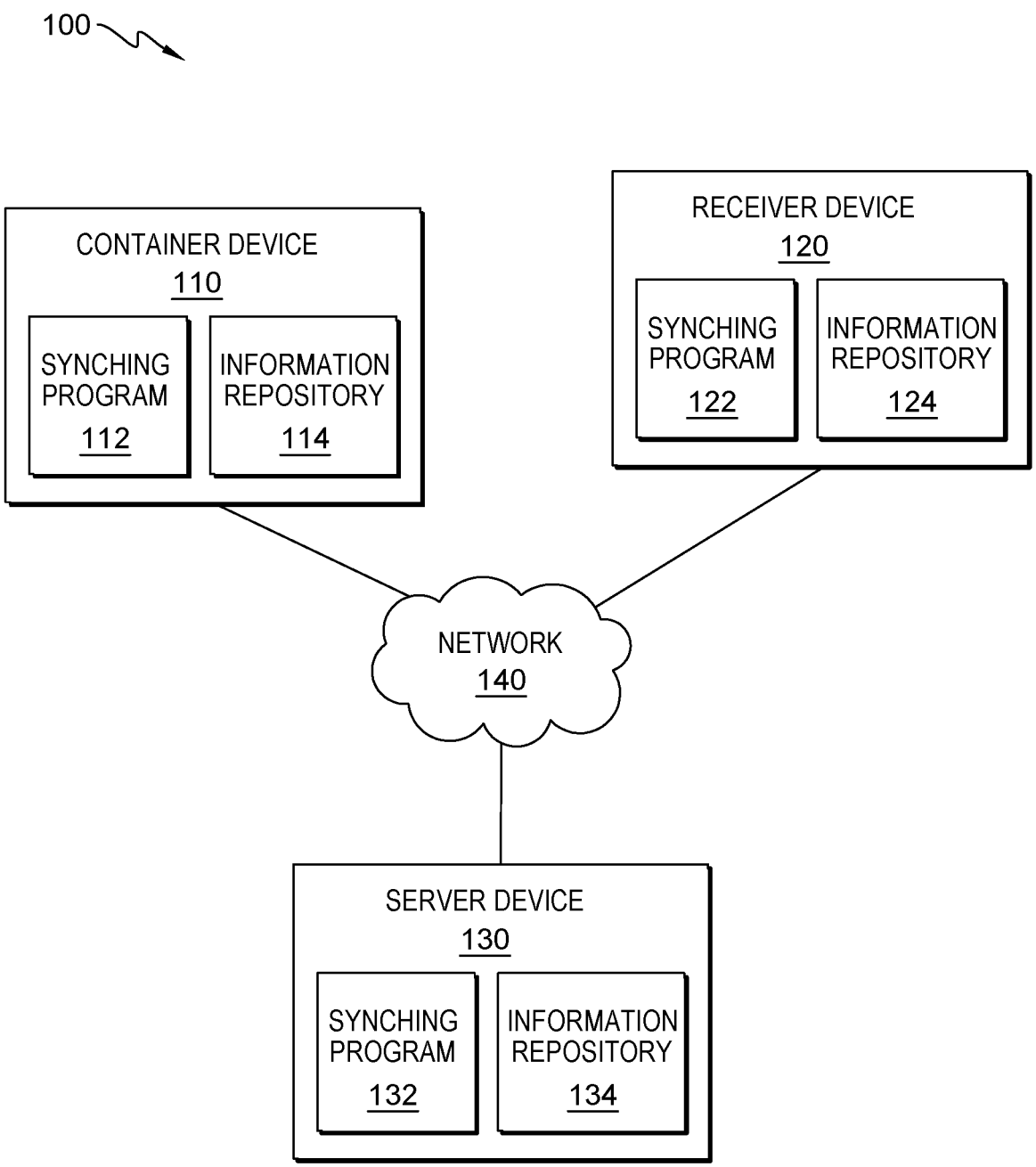
FIG. 1 is a functional block diagram of a network computing environment, generally designated 100, suitable for operation of synching program 112, 122, 132 in accordance with at least one embodiment of the invention.

Referring now to various embodiments of the invention in more detail, FIG. 1 is a functional block diagram of a network computing environment, generally designated 100, suitable for operation of synching program 112, 122, 132 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes container device 110, receiver device 120, and server device 130 interconnected over network 140. In embodiments of the present invention, network 140 can be a telecommunications network, a local area network (LAN), a wide area network (WAN), such as the Internet, or a combination of the three, and can include wired, wireless, or fiber optic connections. Network 140 may include one or more wired and/or wireless networks that are capable of receiving and transmitting data, voice, and/or video signals, including multimedia signals that include voice, data, and video formation. In general, network 140 may be any combination of connections and protocols that will support communications between container device 110 and other computing devices (not shown) within network computing environment 100.

Container device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, container device 110 represents any programmable electronic devices or combination of programmable electronic devices capable of executing machine readable program instructions and communicating with other computing devices (not shown) within computing environment 100 via a network, such as network 140. In an example, container device 110 is the container device of FIG. 8 and FIG. 9.

In various embodiments of the invention, container device 110 may be a computing device that can be a standalone device, a management server, a web server, a media server, a mobile computing device, or any other programmable electronic device or computing system capable of receiving, sending, and processing data. In other embodiments, container device 110 represents a server computing system utilizing multiple computers as a server system, such as in a cloud computing environment. In an embodiment, container device 110 represents a computing system utilizing clustered computers and components (e.g. database server computers, application server computers, web servers, and media servers) that act as a single pool of seamless resources when accessed within network computing environment 100.

In various embodiments of the invention, container device 110 includes synching program 112 and information repository 114.

In an embodiment, container device 110 includes synching program 112. A first embodiment of the present invention provides for a synching program 112 that initiates a web application. In a first embodiment of the present invention, synching program 112 receives a share component. In a first embodiment of the present invention, synching program 112 receives a connection request. In a first embodiment of the present invention, synching program 112 pushes the share component. In a first embodiment of the present invention, synching program 112 receives an updated share component. In a first embodiment of the present invention, synching program 112 requests an updated share component. In a first embodiment of the present invention, synching program 112 receives updated share component. A second embodiment of the present invention provide for a synching program 112 that initiates a web application. In a second embodiment of the present invention, synching program 112 receives a share component. In a second embodiment of the present invention, synching program 112 edits share component. In a second embodiment of the present invention, synching program 112 pushes updated share component. In a second embodiment of the present invention, synching program 112 receives updated share component. In an embodiment, synching program 112 may be integrated into a web browser or other program (not shown) that manages and/or edits components.

In an embodiment, container device 110 includes information repository 114. In an embodiment, information repository 114 may be managed by synching program 112. In an alternative embodiment, information repository 114 may be managed by the operating system of container device 110, another program in network computing environment 100, another program (not shown), alone, or together with, synching program 112. Information repository 114 is a data repository that can store, gather, and/or analyze information. In some embodiments, information repository 114 is located externally to container device 110 and accessed through a communication network, such as network 140. In some embodiments, information repository 114 is stored on container device 110. In some embodiments, information repository 114 may reside on another computing device (not shown), provided information repository 114 is accessible by container device 110. Information repository 114 may include, but is not limited to, data being modified or edited, login credentials, approved devices, etc.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Receiver device 120 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, receiver device 120 represents any programmable electronic devices or combination of programmable electronic devices capable of executing machine readable program instructions and communicating with other computing devices (not shown) within computing environment 100 via a network, such as network 140. In an example, receiver device 120 is the receiver device of FIG. 8 and FIG. 9.

In various embodiments of the invention, receiver device 120 may be a computing device that can be a standalone device, a management server, a web server, a media server, a mobile computing device, or any other programmable electronic device or computing system capable of receiving, sending, and processing data. In other embodiments, receiver device 120 represents a server computing system utilizing multiple computers as a server system, such as in a cloud computing environment. In an embodiment, receiver device 120 represents a computing system utilizing clustered computers and components (e.g. database server computers, application server computers, web servers, and media servers) that act as a single pool of seamless resources when accessed within network computing environment 100.

In various embodiments of the invention, receiver device 120 includes synching program 122 and information repository 124.

In an embodiment, receiver device 120 includes synching program 122. A first embodiment of the present invention provides for a synching program 122 that receives a connection request. In a first embodiment of the present invention, synching program 122 requests a share component. In a first embodiment of the present invention, synching program 122 edits share component. In a first embodiment of the present invention, synching program 122 pushes updated share component. In a first embodiment of the present invention, synching program 122 receives updated share component. A second embodiment of the present invention provide for a synching program 122 that initiates a web application. In a second embodiment of the present invention, synching program 122 receives a share component. In a second embodiment of the present invention, synching program 122 edits share component. In a second embodiment of the present invention, synching program 122 pushes updated share component. In a second embodiment of the present invention, synching program 122 receives updated share component. In an embodiment, synching program 122 may be integrated into a web browser or other program (not shown) that manages and/or edits components.

In an embodiment, receiver device 120 includes information repository 124. In an embodiment, information repository 124 may be managed by synching program 122. In an alternative embodiment, information repository 124 may be managed by the operating system of receiver device 120, another program in network computing environment 100, another program (not shown), alone, or together with, synching program 122. Information repository 124 is a data repository that can store, gather, and/or analyze information. In some embodiments, information repository 124 is located externally to receiver device 120 and accessed through a communication network, such as network 140. In some embodiments, information repository 124 is stored on receiver device 120. In some embodiments, information repository 124 may reside on another computing device (not shown), provided information repository 124 is accessible by receiver device 120. Information repository 124 may include, but is not limited to, data being modified or edited, login credentials, approved devices, etc.

Information repository 124 may be implemented using any volatile or non-volatile storage media for storing information, as known in the art. For example, information repository 124 may be implemented with a tape library, optical library, one or more independent hard disk drives, multiple hard disk drives in a redundant array of independent disks (RAID), solid-state drives (SSD), or random-access memory (RAM). Similarly, information repository 124 may be implemented with any suitable storage architecture known in the art, such as a relational database, an object-oriented database, or one or more tables.

Server device 130 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, server device 130 represents any programmable electronic devices or combination of programmable electronic devices capable of executing machine readable program instructions and communicating with other computing devices (not shown) within computing environment 100 via a network, such as network 140. In an example, server device 130 is the server device of FIG. 8 and FIG. 9.

In various embodiments of the invention, server device 130 may be a computing device that can be a standalone device, a management server, a web server, a media server, a mobile computing device, or any other programmable electronic device or computing system capable of receiving, sending, and processing data. In other embodiments, server device 130 represents a server computing system utilizing multiple computers as a server system, such as in a cloud computing environment. In an embodiment, server device 130 represents a computing system utilizing clustered computers and components (e.g. database server computers, application server computers, web servers, and media servers) that act as a single pool of seamless resources when accessed within network computing environment 100.

In various embodiments of the invention, server device 130 includes synching program 132 and information repository 134.

In an embodiment, server device 130 includes synching program 132. A first embodiment of the present invention provides for a synching program 132 that initiates a web application. In a first embodiment of the present invention, synching program 132 pushes a share component. In a first embodiment of the present invention, synching program 132 receives an updated share component. In a first embodiment of the present invention, synching program 132 pushes the updated share component. A second embodiment of the present invention provide for a synching program 132 that initiates a web application. In a second embodiment of the present invention, synching program 132 pushes a share component. In a second embodiment of the present invention, synching program 132 receives an updated share component. In a second embodiment of the present invention, synching program 132 pushes the updated share component. In an embodiment, synching program 132 may be integrated into a web browser or other program (not shown) that manages and/or edits components.

In an embodiment, server device 130 includes information repository 134. In an embodiment, information repository 134 may be managed by synching program 132. In an alternative embodiment, information repository 134 may be managed by the operating system of server device 130, another program in network computing environment 100, another program (not shown), alone, or together with, synching program 132. Information repository 134 is a data repository that can store, gather, and/or analyze information. In some embodiments, information repository 134 is located externally to server device 130 and accessed through a communication network, such as network 140. In some embodiments, information repository 134 is stored on server device 130. In some embodiments, information repository 134 may reside on another computing device (not shown), provided information repository 134 is accessible by server device 130. Information repository 134 may include, but is not limited to, data being modified or edited, login credentials, approved devices, etc.

Information repository 134 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 134 may be implemented with any suitable storage architecture known in the art, such as a relational database, an object-oriented database, or one or more tables.

In an embodiment, container device 110, receiver device 120, and server device 130 include a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

As referred to herein, all data retrieved, collected, and used, is used in an opt-in manner, i.e., the data provider has given permission for the data to be used. For example, the input, received, sent and/or modified data received and used by synching program 112, 122, 132.

Figure 2:
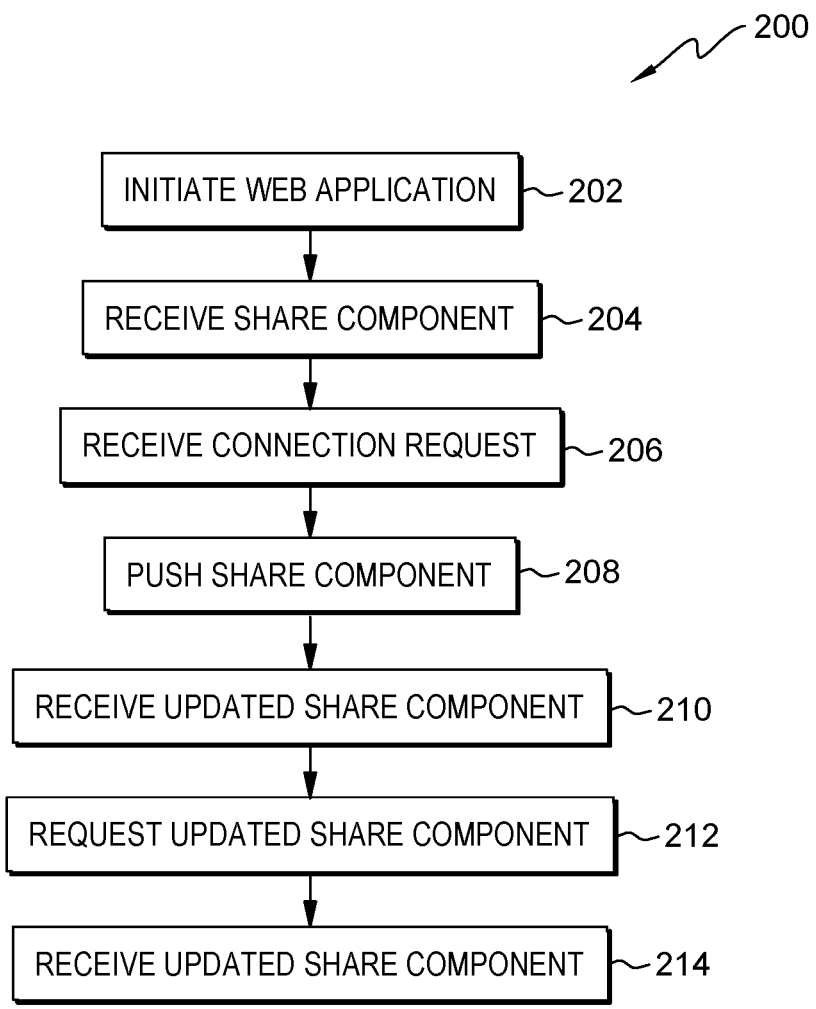
FIG. 2 is a flow chart diagram depicting operational steps for synching program 112 for synchronous shared webpage fragments across devices, in accordance with a first embodiment of the invention.

FIG. 2 is a flow chart diagram of workflow 200 depicting operational steps for synching program 112 in accordance with at least one embodiment of the invention. In an alternative embodiment, the steps of workflow 200 may be performed by any other program while working with synching program 112. It should be appreciated that embodiments of the present invention provide at least for synchronous shared webpage fragments across devices. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 200 upon a user wanting synching program 112 to sync shared webpage fragments across devices.

Synching program 112 initiates a web application (step 202). At step 202, synching program 112 receives an indication, via the user interface (not shown), that a user would like to initiate a web-based application. In an embodiment, the indication may include the web-based application along with login credentials. In a first embodiment, synching program 112 may verify the login credentials using data stored in information repository 114. If synching program 112 receives correct login credentials, synching program 112 passes on a "token" indicating the correct login to the web-based application managed, at least in part, by synching program 132. In a second embodiment, synching program 112 may pass the login credentials on to the web-based application managed, at least in part, by synching program 132, and synching program 112 receives an indication of verification of the accuracy of the login credentials. In an embedment, if the login credentials, in either embodiment, are not verified, synching program 112 may request, via the user interface (not shown), updated login credentials. In an embodiment, the web-based application may be an HTLM based web page that includes any number of components for interaction. For example, the web-based application may be a fillable form on a web page. In this example, a user has logged into a portal on the web page that allows for the form to be filled in. Here, the fillable form may be available and protected by a portal found on the web page. In an embodiment, step 202, performed by synching program 112, is one side of the interaction that occurs with step 402, performed by synching program 132, that is the other side of the interaction. In an embodiment, synching program 132 may issue a public/private key pair to synching program 112 to be used to identify verified devices.

Synching program 112 receives a share component (step 204). At step 204, synching program 112 receives the share component, for example the fillable form. In an embodiment, the fillable form may be the share component. In an alternative embodiment, the fillable form may be made of multiple components and synching program 112 may receive one or more share components (i.e. the entire form). In yet another embodiment, synching program may receive a single share component (i.e. a piece of information, such as the Name of the Applicant, in the form). In an embodiment, the share component may include a browser level standard tag that can be identified by the browser, with the following attributes: share protocol, share authority, and pre-defined parameters for component initiation and connection established. In an embodiment, the share protocol may be HTTPS, websocket, or any other share protocol known in the art. In an embodiment, share authority may be read, write, delete, create, or any other share authority known in the art. In an embodiment, the pre-defined parameters may be, for example, JSON formatted data used to communicate between shared components that is used to pass parameters. In an embodiment, step 204, performed by synching program 112, is one side of the interaction that occurs with step 404, performed by synching program 132, that is the other side of the interaction.

Synching program 112 receives a connection request (step 206). At step 206, synching program 112, receives a connection request from the user, via synching program 122, from receiver device 120. In an embodiment, the connection request is for access, via computing device 120, to one or more share components that synching program 112 on container device 110 has access to. In an embodiment, step 206, performed by synching program 112, is one side of the interaction that occurs with step 302, performed by synching program 122, that is the other side of the interaction. In an embodiment, the connection request may be from a device that has been approved and previously linked as a verified and/or approved device for transmitting a share component. In this embodiment, synching program 112 receives login credentials from receiver device 120 via synching program 112. Here, synching program 112 verifies the received login credentials against login credentials found in information repository 114, and if the login credentials are approved then synching program 122 on receiver device 120 is verified and/or approved. In an embodiment, the connection request may be for a specific shared component, all shared components, the last work on shared component, the next shared component after the last worked on shared component, etc. In an embodiment, the connection formed between container device 110 and receiver device 120 may be an HTTP persistent connection (i.e. Socket, Websocket, etc.). In an embodiment, step 206, performed by synching program 112, is one side of the interaction that occurs with step 304, performed by synching program 122, that is the other side of the interaction. In an embodiment, synching program 112 may issue the received public/private key pair to synching program 122 to be used to identify verified devices.

Synching program 112 pushes the share component (step 208). At step 208, synching program 112 receives a share component request and synching program 112 pushes (i.e. send, transmits, transfers, etc.) the share component to synching program 122 on receiver device 120. In a first embodiment, synching program 112 pushes a single share component. For example, synching program 112 pushes the "Name of the Applicant" component. In a second embodiment, synching program 112 pushes one or more share component. For example, synching program 112 may push the entire fillable form which may include one or more already filled shared component and/or one or more unfilled in shared component. In an embodiment, synching program 112 reviews the share authority to determine if the share component can be sent to synching program 122 on receiver device 120. In an embodiment, step 208, performed by synching program 112, is one side of the interaction that occurs with step 304, performed by synching program 122, that is the other side of the interaction.

Synching program 112 receives an updated share component (step 210). At step 210, synching program 112 receives one or more updates to one or more share components. In an embodiment, synching program 112 receives the one or more updates to the one or more share components from synching program 122. Upon receiving an updated one or more share component, synching program 112 communicates the updates to synching program 132 found on server device 130. In an embodiment, parts of step 210, performed by synching program 112, is one side of the interaction that occurs with parts of step 308, performed by synching program 122, that is the other side of the interaction. In an embodiment, parts of step 210, performed by synching program 112, is one side of the interaction that occurs with parts of step 406, performed by synching program 132, that is the other side of the interaction. In an embodiment, synching program 112 may receive the public/private key pair to be used to identify that synching program 122 on receiver device 120 is verified.

Synching program 112 receives a request for an updated share component (step 212). At step 212, synching program 112 receives a request for an updated share component from synching program 122 on receiver device 120. Step 212 is substantially similar to step 208. In step 212, a share component has been updated by another device and synching program 112 receives a share component request and synching program 112 pushes (i.e. send, transmits, transfers, etc.) the updated share component to synching program 122 on receiver device 120. In an embodiment, step 212, performed by synching program 112, is one side of the interaction that occurs with step 310, performed by synching program 122, that is the other side of the interaction. In an embodiment, synching program 112 may receive the public/private key pair with the request to be used to identify that synching program 122 on receiver device 120 is verified.

Synching program 112 receives an updated share component (step 214). At step 214, synching program 112 receives an updated share component. Step 214 is substantially similar to step 210. In step 214, synching program receives an updated share component of an updated share component sent previously (i.e. step 212). In an embodiment, synching program 112 may receive the public/private key pair with the updated share component to be used to identify that synching program 122 on receiver device 120 is verified.

Figure 3:
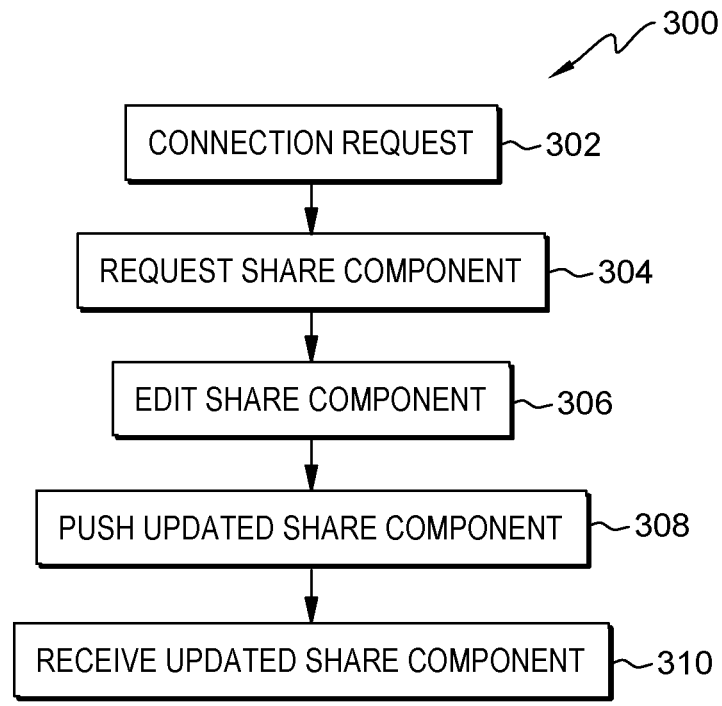
FIG. 3 is a flow chart diagram depicting operational steps for synching program 122 for synchronous shared webpage fragments across devices, in accordance with a first embodiment of the invention.

FIG. 3 is a flow chart diagram of workflow 300 depicting operational steps for synching program 122 in accordance with at least one embodiment of the invention. In an alternative embodiment, the steps of workflow 300 may be performed by any other program while working with synching program 122. It should be appreciated that embodiments of the present invention provide at least for synchronous shared webpage fragments across devices. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 300 upon a user wanting synching program 122 to sync shared webpage fragments across devices.

Synching program 122 initiates a connection request (step 302). At step 202, synching program 122 on receiver device 120 initiates a connection request to synching program 112 on container device 110. In an embodiment, the connection request is for access, via computing device 120, to one or more share components that synching program 112 has access to container device 110. In an embodiment, a user may need to login to synching program 122 on receiver device and synching program 122 compares the received credentials to stored credentials in information repository 124 to determine a properly verified/authorized user. In an embodiment, receiver device 120 may be pre-approved by synching program 112 on container device, and synching program 122 on receiver device 120 sends synching program 112 on container device information that identifies receiver device 120 in order to establish the connection. In an alternative embodiment, synching program 122 on receiver device 120 may transmit a token that indicates that receiver device 120 is an approve device. In an embodiment, the connection request may be for a specific shared component, all shared components, the last work on shared component, the next shared component after the last worked on shared component, etc. In an embodiment, the connection formed between receiver device 120 and container device 110 may be an HTTP persistent connection (i.e. Socket, Websocket, etc.). In an embodiment, step 304, performed by synching program 122, is one side of the interaction that occurs with step 206, performed by synching program 112, that is the other side of the interaction. In an embodiment, synching program 122 may receive the issued public/private key pair from synching program 112 to be used to identify verified devices.

Synching program 122 requests a share component (step 304). At step 304, synching program 122, on receiver device 120, requests one or more share components from synching program 112 on container device 110. In a first embodiment, synching program 122 requests a single share component. For example, synching program 122 requests the "Name of the Applicant" component. In a second embodiment, synching program 122 requests one or more share component. For example, synching program 122 may request the entire fillable form which may include one or more already filled shared component and/or one or more unfilled in shared component. In an embodiment, step 304, performed by synching program 122, is one side of the interaction that occurs with step 208, performed by synching program 112, that is the other side of the interaction. In an embodiment, synching program 122 may transmit the issued public/private key pair with the request to synching program 112 to be used to identify verified devices.

Synching program 122 edits the share component (step 306). At step 306, synching program 122, receives updates from the user via the user interface to the one or more share components. In an embodiment, synching program 122 may work with another program (not shown), for example a web browser, to receive the updates to the one or more share components.

Synching program 122 pushes the updated share component (step 308). At step 308, synching program 122 pushes or sends the updated share component to synching program 112 on container device 110. In an embodiment, step 308, performed by synching program 122, is one side of the interaction that occurs with parts of step 210, performed by synching program 112, that is the other side of the interaction. In an embodiment, synching program 122 may transmit the issued public/private key pair with the updated share component to synching program 112 to be used to identify verified devices.

Synching program 122 receives an updated share component (step 310). At step 310, synching program 122 receives an updated share component. In an embodiment, another device (not shown) has updated the share component. In this embodiment, synching program 122 receives an updated share component similar to receiving the share component requested in step 304. In an embodiment, step 310 allow for updating share components on multiple devices and receiving the newly updated share component for working on the updated share component on another device.

Figure 4:
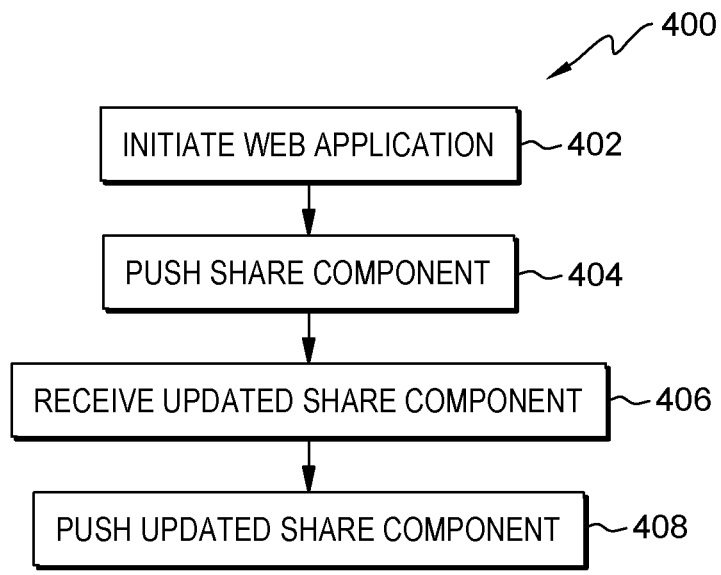
FIG. 4 is a flow chart diagram depicting operational steps for synching program 132 for synchronous shared webpage fragments across devices, in accordance with a first embodiment of the invention.

FIG. 4 is a flow chart diagram of workflow 400 depicting operational steps for synching program 132 in accordance with at least one embodiment of the invention. In an alternative embodiment, the steps of workflow 400 may be performed by any other program while working with synching program 132. It should be appreciated that embodiments of the present invention provide at least for synchronous shared webpage fragments across devices. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 400 upon a user wanting synching program 132 to sync shared webpage fragments across devices.

Synching program 132 initiates a web application (step 402). At step 402, synching program 132 receives an indication from synching program 112 on container device 110 to initiate a web application. In an embodiment, the indication may also include login credentials that synching program 132 verifies using data stored in information repository 134. In an alternative embodiment, the indication may also include a "token" that synching program 132 can use to verify the initiation of the web application by synching program 112. In an embodiment, if synching program 132 verifies the login credentials then the web application is initialized and synching program 132 may notify synching program 112 of the available one or more share components authorized for updating/editing. In an embodiment, if synching program 132 does not verify the login credentials then synching program 132 may request updated login credentials or indicate an improper login attempt. In an embodiment, step 402, performed by synching program 132, is one side of the interaction that occurs with step 202, performed by synching program 112, that is the other side of the interaction. In an embodiment, synching program 132 may issue a public/private key pair to synching program 112 to be used to identify verified devices.

Synching program 132 pushes a share component (step 404). At step 404, synching program 132 pushes or sends the share component to synching program 112 on container device 110. In an embodiment, the pushed share component may be requested by synching program 112 upon initialization of the web application. In an alternative embodiment, the pushed share component may be requested by synching program 112 in an alternative indication. In an embodiment, step 404, performed by synching program 132, is one side of the interaction that occurs with step 204, performed by synching program 112, that is the other side of the interaction.

Synching program 132 receives an updated share component (step 406). At step 406, synching program 132, receives an updated share component from synching program 112. In an embodiment, parts of step 406, performed by synching program 132, is one side of the interaction that occurs with parts of step 210, performed by synching program 112, that is the other side of the interaction. In an embodiment, synching program 132 may receive a public/private key pair with the updated share component from synching program 112 to be used to identify verified devices.

Synching program 132 pushes the updated share component (step 408). At step 408, synching program 132 pushes or sends the share component to synching program 112 on container device 110 or any other synching program (not shown) on any other device (not shown) that requests the updated share component.

Figure 5:
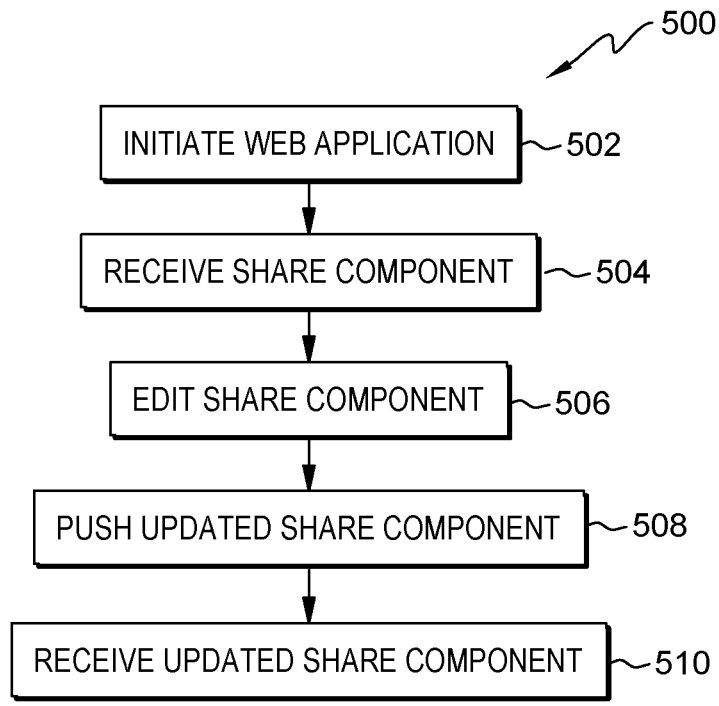
FIG. 5 is a flow chart diagram depicting operational steps for synching program 112 for synchronous shared webpage fragments across devices, in accordance with a second embodiment of the invention.

FIG. 5 is a flow chart diagram of workflow 500 depicting operational steps for synching program 112 in accordance with at least one embodiment of the invention. In an alternative embodiment, the steps of workflow 500 may be performed by any other program while working with synching program 112. It should be appreciated that embodiments of the present invention provide at least for synchronous shared webpage fragments across devices. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 500 upon a user wanting synching program 112 to sync shared webpage fragments across devices.

Synching program 112 initiates a web application (step 502). At step 502, synching program 112 receives an indication, via the user interface (not shown), that a user would like to initiate a web-based application. In an embodiment, the indication may include the web-based application along with login credentials. In a first embodiment, synching program 112 may verify the login credentials using data stored in information repository 114. If synching program 112 receives correct login credentials, synching program 112 passes on a "token" indicating the correct login to the web-based application managed, at least in part, by synching program 132. In a second embodiment, synching program 112 may pass the login credentials on to the web-based application managed, at least in part, by synching program 132, and synching program 112 receives an indication of verification of the accuracy of the login credentials. In an embedment, if the login credentials, in either embodiment, are not verified, synching program 112 may request, via the user interface (not shown), updated login credentials. In an embodiment, the web-based application may be an HTLM based web page that includes any number of components for interaction. For example, the web-based application may be a fillable form on a web page. In this example, a user has logged into a portal on the web page that allows for the form to be filled in. Here, the fillable form may be available and protected by a portal found on the web page. In an embodiment, step 502, performed by synching program 112, is one side of the interaction that occurs with step 702, performed by synching program 132, that is the other side of the interaction. In an embodiment, synching program 132 may issue a public/private key pair to synching program 112 to be used to identify verified devices.

Synching program 112 receives a share component (step 504). At step 504, synching program 112 receives the share component, for example the fillable form. In an embodiment, the fillable form may be the share component. In an alternative embodiment, the fillable form may be made of multiple components and synching program 112 may receive one or more share components (i.e. the entire form). In yet another embodiment, synching program may receive a single share component (i.e. a piece of information, such as the Name of the Applicant, in the form). In an embodiment, the share component may include a browser level standard tag that can be identified by the browser, with the following attributes: share protocol, share authority, and pre-defined parameters for component initiation and connection established. In an embodiment, the share protocol may be HTTPS, websocket, or any other share protocol known in the art. In an embodiment, share authority may be read, write, delete, create, or any other share authority known in the art. In an embodiment, the pre-defined parameters may be, for example, JSON formatted data used to communicate between shared components that is used to pass parameters. In an embodiment, step 504, performed by synching program 112, is one side of the interaction that occurs with step 704, performed by synching program 132, that is the other side of the interaction.

Synching program 112 edits the share component (step 506). At step 506, synching program 112, receives updates from the user via the user interface to the one or more share components. In an embodiment, synching program 112 may work with another program (not shown), for example a web browser, to receive the updates to the one or more share components.

Synching program 112 pushes the updated share component (step 508). At step 508, synching program 112 pushes or sends the updated share component to synching program 132 on server device 130. In an embodiment, step 508, performed by synching program 112, is one side of the interaction that occurs with parts of step 706, performed by synching program 132, that is the other side of the interaction. In an embodiment, synching program 112 may include the public/private key pair with the updated share component to be used to identify that synching program 112 is verified.

Synching program 112 receives an updated share component (step 510). At step 510, synching program 112 receives an updated share component. In an embodiment, another device, for example synching program 122 on receiver device 120, has updated the share component. In this embodiment, synching program 112 receives an updated share component similar to receiving the share component requested in step 504. In an embodiment, step 510 allow for updating share components on multiple devices and receiving the newly updated share component for working on the updated share component on another device. In an embodiment, step 510, performed by synching program 112, is one side of the interaction that occurs with parts of step 708, performed by synching program 132, that is the other side of the interaction.

Figure 6:
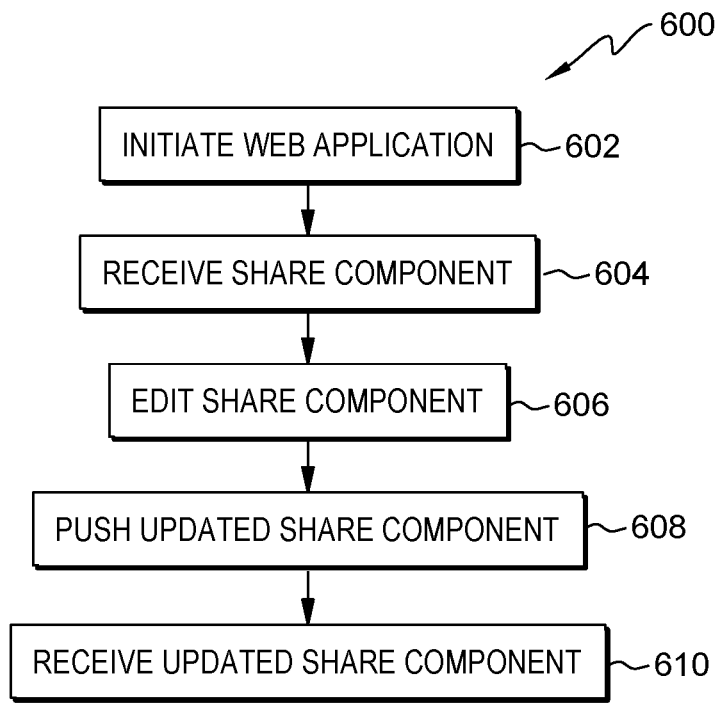
FIG. 6 is a flow chart diagram depicting operational steps for synching program 122 for synchronous shared webpage fragments across devices, in accordance with a second embodiment of the invention.

FIG. 6 is a flow chart diagram of workflow 600 depicting operational steps for synching program 122 in accordance with at least one embodiment of the invention. In an alternative embodiment, the steps of workflow 600 may be performed by any other program while working with synching program 122. It should be appreciated that embodiments of the present invention provide at least for synchronous shared webpage fragments across devices. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 600 upon a user wanting synching program 122 to sync shared webpage fragments across devices.

Synching program 122 initiates a web application (step 602). At step 602, synching program 122 receives an indication, via the user interface (not shown), that a user would like to initiate a web-based application. In an embodiment, the indication may include the web-based application along with login credentials. In a first embodiment, synching program 122 may verify the login credentials using data stored in information repository 124. If synching program 122 receives correct login credentials, synching program 122 passes on a "token" indicating the correct login to the web-based application managed, at least in part, by synching program 132. In a second embodiment, synching program 122 may pass the login credentials on to the web-based application managed, at least in part, by synching program 132, and synching program 122 receives an indication of verification of the accuracy of the login credentials. In an embedment, if the login credentials, in either embodiment, are not verified, synching program 122 may request, via the user interface (not shown), updated login credentials. In an embodiment, the web-based application may be an HTLM based web page that includes any number of components for interaction. For example, the web-based application may be a fillable form on a web page. In this example, a user has logged into a portal on the web page that allows for the form to be filled in. Here, the fillable form may be available and protected by a portal found on the web page. In an embodiment, step 602, performed by synching program 122, is one side of the interaction that occurs with step 702, performed by synching program 132, that is the other side of the interaction. In an embodiment, synching program 132 may issue a public/private key pair to synching program 122 to be used to identify verified devices.

Synching program 122 receives a share component (step 604). At step 604, synching program 122 receives the share component, for example the fillable form. In an embodiment, the fillable form may be the share component. In an alternative embodiment, the fillable form may be made of multiple components and synching program 122 may receive one or more share components (i.e. the entire form). In yet another embodiment, synching program may receive a single share component (i.e. a piece of information, such as the Name of the Applicant, in the form). In an embodiment, the share component may include a browser level standard tag that can be identified by the browser, with the following attributes: share protocol, share authority, and pre-defined parameters for component initiation and connection established. In an embodiment, the share protocol may be HTTPS, websocket, or any other share protocol known in the art. In an embodiment, share authority may be read, write, delete, create, or any other share authority known in the art. In an embodiment, the pre-defined parameters may be, for example, JSON formatted data used to communicate between shared components that is used to pass parameters. In an embodiment, step 604, performed by synching program 122, is one side of the interaction that occurs with step 704, performed by synching program 132, that is the other side of the interaction.

Synching program 122 edits the share component (step 606). At step 606, synching program 122, receives updates from the user via the user interface to the one or more share components. In an embodiment, synching program 122 may work with another program (not shown), for example a web browser, to receive the updates to the one or more share components.

Synching program 122 pushes the updated share component (step 608). At step 608, synching program 122 pushes or sends the updated share component to synching program 132 on server device 130. In an embodiment, step 608, performed by synching program 122, is one side of the interaction that occurs with parts of step 706, performed by synching program 132, that is the other side of the interaction. In an embodiment, synching program 122 may include the public/private key pair with the updated share component to be used to identify that synching program 122 is verified.

Synching program 122 receives an updated share component (step 610). At step 610, synching program 122 receives an updated share component. In an embodiment, another device, for example synching program 112 on container device 120, has updated the share component. In this embodiment, synching program 122 receives an updated share component similar to receiving the share component requested in step 604. In an embodiment, step 610 allow for updating share components on multiple devices and receiving the newly updated share component for working on the updated share component on another device. In an embodiment, step 610, performed by synching program 122, is one side of the interaction that occurs with parts of step 708, performed by synching program 132, that is the other side of the interaction.

Figure 7:
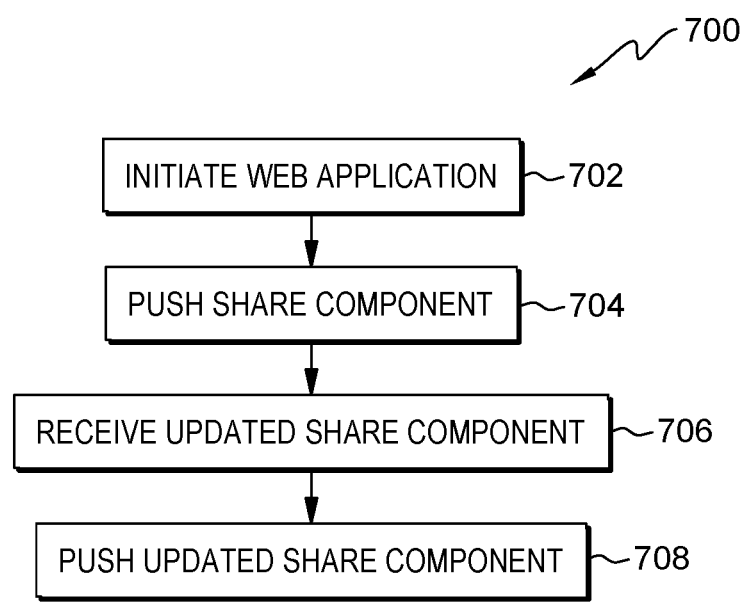
FIG. 7 is a flow chart diagram depicting operational steps for synching program 132 for synchronous shared webpage fragments across devices, in accordance with a second embodiment of the invention.

FIG. 7 is a flow chart diagram of workflow 700 depicting operational steps for synching program 132 in accordance with at least one embodiment of the invention. In an alternative embodiment, the steps of workflow 700 may be performed by any other program while working with synching program 132. It should be appreciated that embodiments of the present invention provide at least for synchronous shared webpage fragments across devices. However, FIG. 7 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 700 upon a user wanting synching program 132 to sync shared webpage fragments across devices.

Synching program 132 initiates a web application (step 702). At step 402, synching program 132 receives an indication from synching program 112 on container device 110 to initiate a web application. In an embodiment, the indication may also include login credentials that synching program 132 verifies using data stored in information repository 134. In an alternative embodiment, the indication may also include a "token" that synching program 132 can use to verify the initiation of the web application by synching program 112. In an embodiment, if synching program 132 verifies the login credentials then the web application is initialized and synching program 132 may notify synching program 112 of the available one or more share components authorized for updating/editing. In an embodiment, if synching program 132 does not verify the login credentials then synching program 132 may request updated login credentials or indicate an improper login attempt. In an embodiment, step 702, performed by synching program 132, is one side of the interaction that occurs with step 502, performed by synching program 112, that is the other side of the interaction. In an embodiment, step 702, performed by synching program 132, is one side of the interaction that occurs with step 602, performed by synching program 122, that is the other side of the interaction. In an embodiment, synching program 132 may issue a public/private key pair to synching program 112 and/or synching program 122 to be used to identify verified devices.

Synching program 132 pushes a share component (step 704). At step 704, synching program 132 pushes or sends the share component to synching program 112 on container device 110 or synching program 122 on receiver device. In an embodiment, the pushed share component may be requested by synching program 112 upon initialization of the web application (step 502) or by synching program 122 upon initialization of the web application (step 602). In an alternative embodiment, the pushed share component may be requested by synching program 112 in an alternative indication or by synching program 122 in an alternative indication. In an embodiment, step 704, performed by synching program 132, is one side of the interaction that occurs with step 504, performed by synching program 112, that is the other side of the interaction. In an embodiment, step 704, performed by synching program 132, is one side of the interaction that occurs with step 604, performed by synching program 122, that is the other side of the interaction.

Synching program 132 receives an updated share component (step 706). At step 706, synching program 132 receives an updated share component from synching program 112 and/or synching program 122. In an embodiment, parts of step 706, performed by synching program 132, is one side of the interaction that occurs with parts of step 508, performed by synching program 112, that is the other side of the interaction. In an embodiment, parts of step 706, performed by synching program 132, is one side of the interaction that occurs with parts of step 608, performed by synching program 122, that is the other side of the interaction. In an embodiment, synching program 132 may receive a public/private key pair with the updated share component to be used to identify verified devices.

Synching program 132 pushes the updated share component (step 708). At step 708, synching program 132 pushes or sends the updated share component to synching program 112 on container device 110, synching program 122 on receiver device 120, or any other synching program (not shown) on any other device (not shown) that requests the updated share component.

Figure 8:
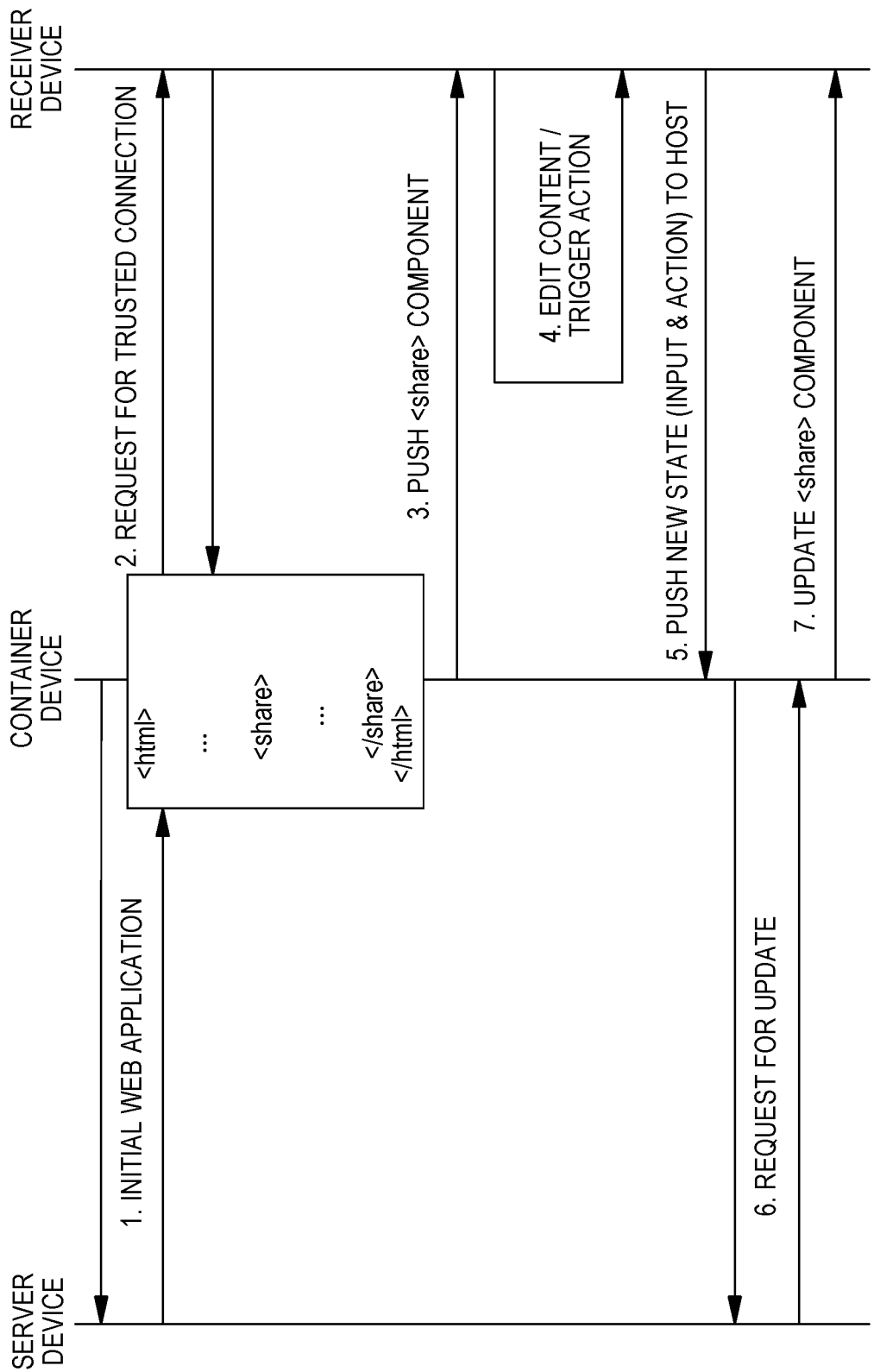
FIG. 8 is a sequence diagram for synching program 112, 122, 132, in accordance with a first embodiment of the present invention.

FIG. 8 is a sequence diagram for synching program 112, 122, 132, in accordance with a first embodiment of the present invention. In this first embodiment, "1. Initial Web Application" are steps 202, 204, and 402. In this first embodiment, "2. Request for trusted connection" are steps 206 and 302. In this first embodiment, "3. Push <share> Component" are steps 208 and 304. In this first embodiment, "4. Edit Content/Trigger Action" are steps 306. In this first embodiment, "5. Push New State (Input & Action) to Host" are steps 210, 308, and 406. In this first embodiment, "6. Request for Update" are steps 212 and 408. In this first embodiment, "7 Update <share> component" are steps 214 and 310.

Figure 9:
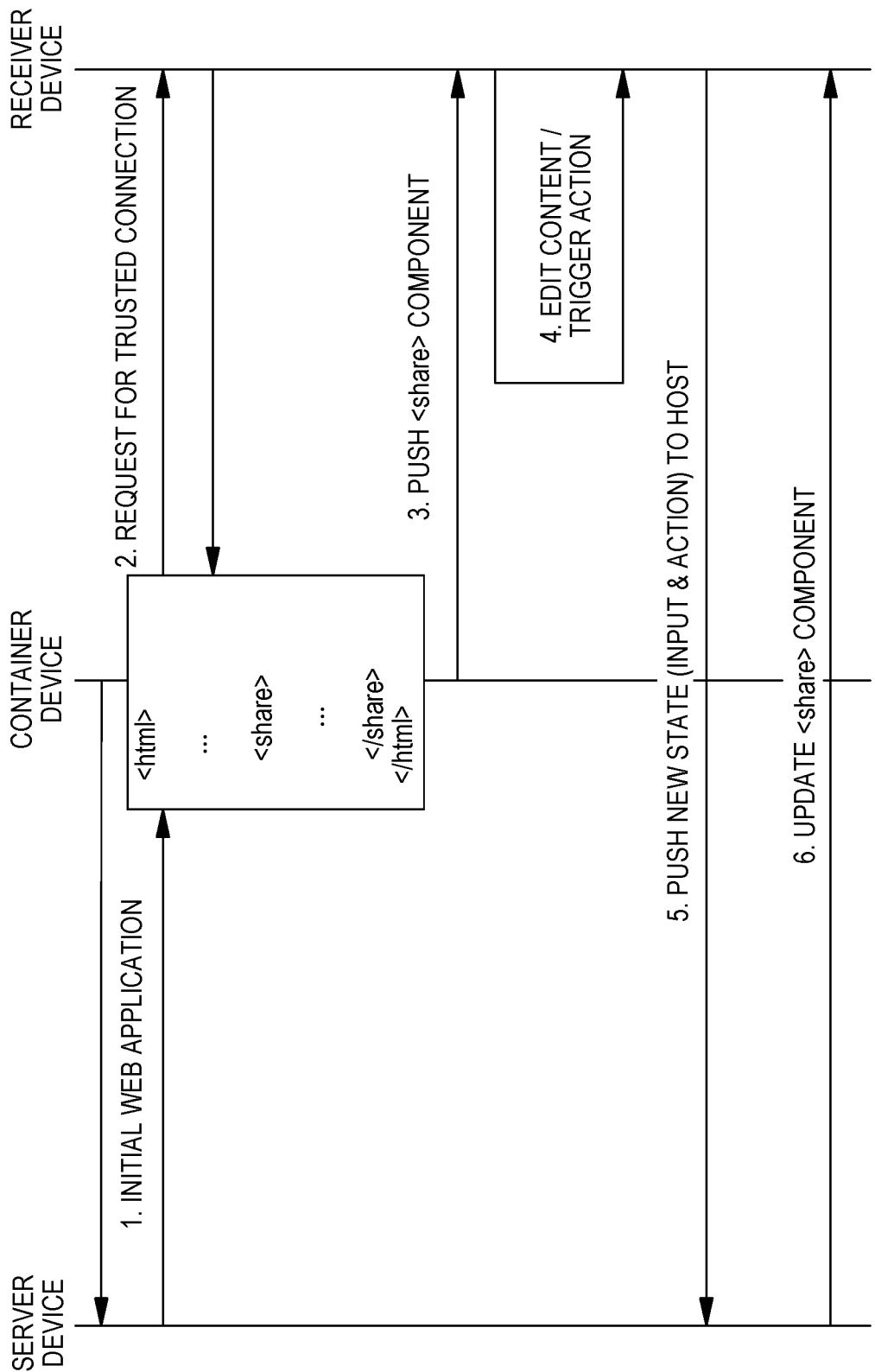
FIG. 9 is a sequence diagram for synching program 112, 122, 132, in accordance with a second embodiment of the present invention.

FIG. 9 is a sequence diagram for synching program 112, 122, 132, in accordance with a second embodiment of the present invention. In this second embodiment, "1. Initial Web Application" are steps 502, 602, and 702. In this second embodiment, "2. Request for trusted connection" are steps 502, 602, and 702. In this second embodiment, "3. Push <share> Component" are steps 504, 604 and 704. In this second embodiment, "4. Edit Content/Trigger Action" is step 606. In this second embodiment, "5. Push New State (Input & Action) to Host" are steps 608 and 706. In this second embodiment, "6 Update <share> component", are steps 610 and 708.

Figure 10:
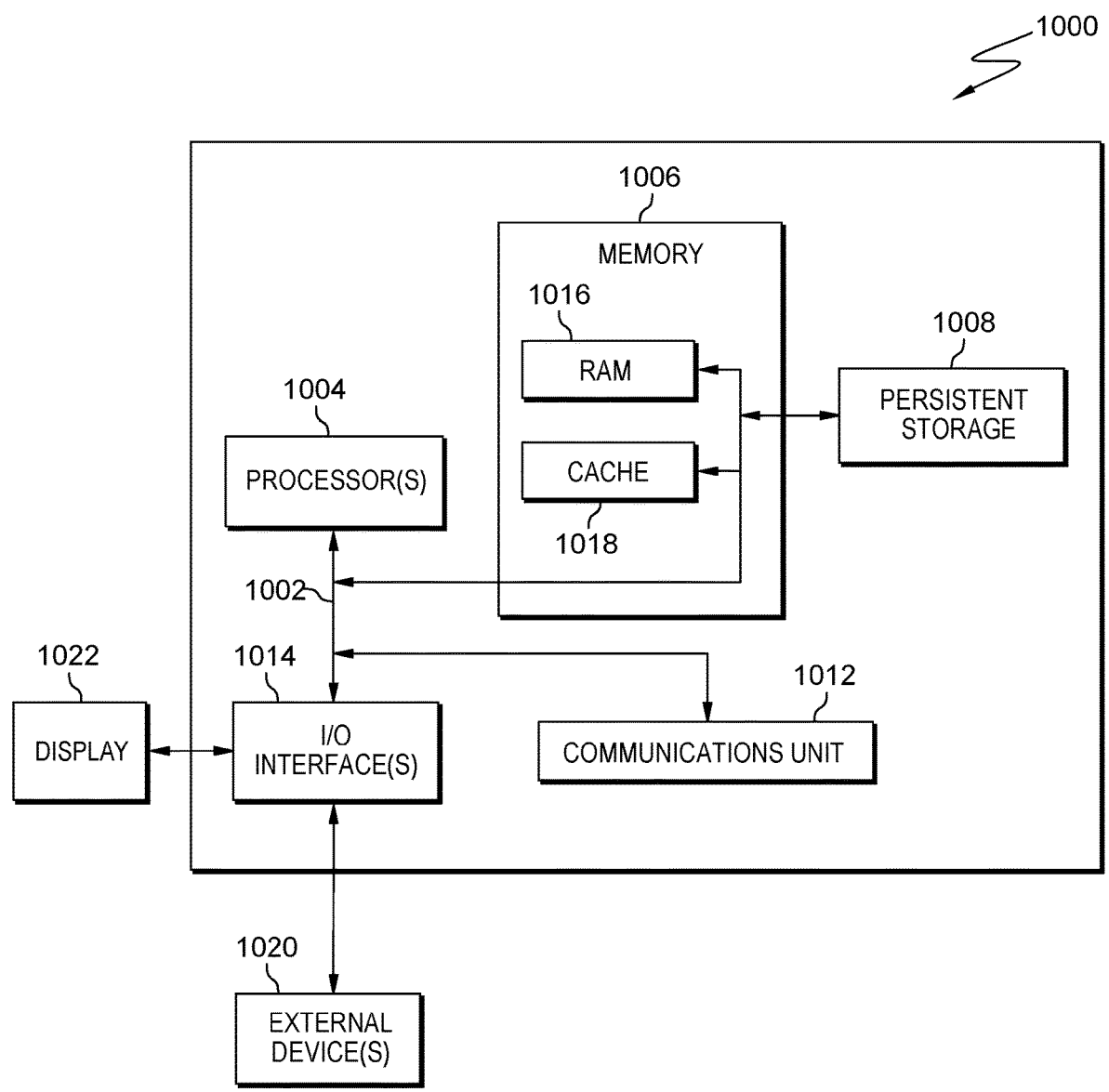
FIG. 10 is a block diagram depicting components of a computer, generally designated 1000, suitable for executing synching program 112, 122, 132, in accordance with at least one embodiment of the invention.

FIG. 10 is a block diagram depicting components of a computer 1000 suitable for synching program 112, 122, 132 in accordance with at least one embodiment of the invention. FIG. 10 displays the computer 1000, one or more processor(s) 1004 (including one or more computer processors), a communications fabric 1002, a memory 1006 including, a RAM 1016, and a cache 1018, a persistent storage 1008, a communications unit 1012, I/O interfaces 1014, a display 1022, and external devices 1020. It should be appreciated that FIG. 10 provides only an illustration of one embodiment and does not imply any limitations with regard to the environments in which different embodiments may be implemented. Many modifications to the depicted environment may be made.

As depicted, the computer 1000 operates over the communications fabric 1002, which provides communications between the computer processor(s) 1004, memory 1006, persistent storage 1008, communications unit 1012, and input/output (I/O) interface(s) 1014. The communications fabric 1002 may be implemented with an architecture suitable for passing data or control information between the processors 1004 (e.g., microprocessors, communications processors, and network processors), the memory 1006, the external devices 1020, and any other hardware components within a system. For example, the communications fabric 1002 may be implemented with one or more buses.

The memory 1006 and persistent storage 1008 are computer readable storage media. In the depicted embodiment, the memory 1006 comprises a random-access memory (RAM) 1016 and a cache 1018. In general, the memory 1006 may comprise any suitable volatile or non-volatile one or more computer readable storage media.

Program instructions for synching program 112, 122, 132 may be stored in the persistent storage 1008, or more generally, any computer readable storage media, for execution by one or more of the respective computer processors 1004 via one or more memories of the memory 1006. The persistent storage 1008 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of the persistent storage 1008.

The communications unit 1012, in these examples, provides for communications with other data processing systems or devices. In these examples, the communications unit 1012 may comprise one or more network interface cards. The communications unit 1012 may provide communications through the use of either or both physical and wireless communications links. In the context of some embodiments of the present invention, the source of the various input data may be physically remote to the computer 1000 such that the input data may be received, and the output similarly transmitted via the communications unit 1012.

The I/O interface(s) 1014 allow for input and output of data with other devices that may operate in conjunction with the computer 1000. For example, the I/O interface 1014 may provide a connection to the external devices 1020, which may be as a keyboard, keypad, a touch screen, or other suitable input devices. External devices 1020 may also include portable computer readable storage media, for example thumb drives, portable optical or magnetic disks, and memory cards. Software and data used to practice embodiments of the present invention may be stored on such portable computer readable storage media and may be loaded onto the persistent storage 1008 via the I/O interface(s) 1014. The I/O interface(s) 1014 may similarly connect to a display 1022. The display 1022 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for synchronous shared webpage fragments across devices, the computer-implemented method comprising:
    initiating, by one or more computer processors, a web application with a server device;
    receiving, by one or more computer processors, a share component of the web application from the server device;
    initiating, by one or more computer processors, a connection with a receiver device;
    pushing, by one or more computer processors, the share component to the receiver device;
    receiving, by one or more computer processors, an updated share component from the receiver device, wherein the updated share component is a modified version of the share component; and
    pushing, by one or more computer processors, the updated share component to the server device.

2. The computer-implemented method of claim 1, further comprising:
    receiving, by one or more computer processors, a second updated share component from the server device; and
    pushing, the second updated share component to the receiver device.

3. The computer-implemented method of claim 1, wherein initiating the web application with a server device comprises:
    transmitting, by one or more computer processors, a login credentials to the server device; and
    receiving, by one more computer processors, a verification of the login credentials from the server device, wherein the verification includes a public/private key pair to be included with all share components.

4. The computer-implemented method of claim 1, wherein the web application is an HTLM based web pages that includes one or more components for interaction, and wherein the one or more components are share components.

5. The computer-implemented method of claim 1, wherein the web application is a Tillable form on a web page that includes one or more components for interaction, and wherein the one or more components are share components.

6. The computer-implemented method of claim 1, wherein the share component includes a browser level standard tag that can be identified by a browser, and wherein the browser level standard tag includes attributes, and wherein the attributes are selected from a group consisting of share protocol, share authority, and pre-defined parameters for component initiation and connection established.

7. The computer-implemented method of claim 3, wherein initiating, by one or more computer processors, a connection with a receiver device comprises:
    receiving, by one or more computer processors, a second login credentials from the receiver device; and
    responsive to verifying the second login credentials, transmitting, by one more computer processors, a verification of the login credentials to the receiver device, wherein the verification includes the public/private key pair to be included with all share components.

8. A computer program product for synchronous shared webpage fragments across devices, the computer program product comprising:

one or more computer readable storage media; and
program instructions stored on the one or more computer readable storage media, the program instructions comprising:
program instructions to initiate a web application with a server device;
program instructions to receive a share component of the web application from the server device;
program instructions to initiate a connection with a receiver device;
program instructions to push the share component to the receiver device;
program instructions to receive an updated share component from the receiver device, wherein the updated share component is a modified version of the share component; and
program instructions to push the updated share component to the server device.

9. The computer program product of claim 8, further comprising program instructions, stored on the one or more computer readable storage media, to:
receive a second updated share component from the server device; and
push the second updated share component to the receiver device.

10. The computer program product of claim 8, wherein program instructions to initiate the web application with a server device comprises:
program instructions to transmit a login credentials to the server device; and
program instructions to receive a verification of the login credentials from the server device, wherein the verification includes a public/private key pair to be included with all share components.

11. The computer program product of claim 8, wherein the web application is an HTLM based web pages that includes one or more components for interaction, and wherein the one or more components are share components.

12. The computer program product of claim 8, wherein the web application is a fillable form on a web page that includes one or more components for interaction, and wherein the one or more components are share components.

13. The computer program product of claim 8, wherein the share component includes a browser level standard tag that can be identified by a browser, and wherein the browser level standard tag includes attributes, and wherein the attributes are selected from a group consisting of share protocol, share authority, and pre-defined parameters for component initiation and connection established.

14. The computer program product of claim 10, wherein program instructions to initiate a connection with a receiver device comprises:
program instructions to receive a second login credentials from the receiver device; and
responsive to verifying the second login credentials, program instructions to transmit a verification of the login credentials to the receiver device, wherein the verification includes the public/private key pair to be included with all share components.

15. A computer system for synchronous shared webpage fragments across devices, the computer system comprising:
one or more computer processors;
one or more computer readable storage media; and
program instructions, stored on the one or more computer readable storage media for execution by at least one of the one or more computer processors, the program instructions comprising;
program instructions to initiate a web application with a server device;
program instructions to receive a share component of the web application from the server device;
program instructions to initiate a connection with a receiver device;
program instructions to push the share component to the receiver device;
program instructions to receive an updated share component from the receiver device, wherein the updated share component is a modified version of the share component; and
program instructions to push the updated share component to the server device.

16. The computer system of claim 15, further comprising program instructions, stored on the one or more computer readable storage media for execution by the at least one of the one or more computer processors, to:
receive a second updated share component from the server device; and
push the second updated share component to the receiver device.

17. The computer system of claim 15, wherein program instructions to initiate the web application with a server device comprises:
program instructions to transmit a login credentials to the server device; and
program instructions to receive a verification of the login credentials from the server device, wherein the verification includes a public/private key pair to be included with all share components.

18. The computer system of claim 15, wherein the web application is an HTLM based web pages that includes one or more components for interaction, and wherein the one or more components are share components.

19. The computer system of claim 15, wherein the web application is a Tillable form on a web page that includes one or more components for interaction, and wherein the one or more components are share components.

20. The computer system of claim 15, wherein the share component includes a browser level standard tag that can be identified by a browser, and wherein the browser level standard tag includes attributes, and wherein the attributes are selected from a group consisting of share protocol, share authority, and pre-defined parameters for component initiation and connection established.

\* \* \* \* \*